United States Patent
Kim

(10) Patent No.: US 6,639,979 B1
(45) Date of Patent: Oct. 28, 2003

(54) AUTOMATIC DIALING METHOD USING CALLER IDENTIFICATION

(75) Inventor: Sung-Hyun Kim, Gumi (KR)

(73) Assignee: Samsung Electronics Co., Ltd., Suwon (KR)

( * ) Notice: Subject to any disclaimer, the term of this patent is extended or adjusted under 35 U.S.C. 154(b) by 924 days.

(21) Appl. No.: 08/768,715

(22) Filed: Dec. 18, 1996

(30) Foreign Application Priority Data

Dec. 20, 1995 (KR) .............................................. 95-52606

(51) Int. Cl.$^7$ ........................... H04M 1/56; H04M 15/06
(52) U.S. Cl. ............................. 379/142.06; 379/142.01; 379/127.01
(58) Field of Search ................................ 379/142, 120, 379/127, 140, 156, 127.01, 142.01, 142.04, 142.06, 142.17

(56) References Cited

U.S. PATENT DOCUMENTS

| | | | |
|---|---|---|---|
| 4,924,496 A | * 5/1990 | Figa et al. ................... | 379/142 |
| 5,054,055 A | 10/1991 | Hanle et al. | |
| 5,251,250 A | 10/1993 | Obata et al. | |
| 5,278,894 A | 1/1994 | Shaw | |
| 5,303,301 A | * 4/1994 | Takahata .................... | 379/142 |
| 5,422,938 A | 6/1995 | Yamanishi | |
| 5,446,785 A | * 8/1995 | Hirai .......................... | 379/142 |
| 5,452,346 A | 9/1995 | Miyamoto | |
| 5,506,895 A | 4/1996 | Hirai et al. | |
| 5,528,680 A | 6/1996 | Karpicke | |
| 5,546,447 A | 8/1996 | Skarbo et al. | |
| 5,553,125 A | 9/1996 | Martensson | |

FOREIGN PATENT DOCUMENTS

| | | |
|---|---|---|
| DE | 40 02 152 A1 | 8/1991 |
| DE | 295 09 526 U1 | 8/1995 |
| EP | 0 746 130 A1 | 12/1996 |

* cited by examiner

*Primary Examiner*—Duc Nguyen
(74) *Attorney, Agent, or Firm*—Robert E. Bushnell, Esq.

(57) ABSTRACT

A dialing method for a telephone system begins by receiving a caller indentification (i.e., telephone number) of a party calling the telephone system. The received caller identification is then stored in a control buffer of the telephone system. A control unit of the telephone system determines whether the caller identification stored in the control buffer is identical to one of a plurality of existing caller identifications stored in a memory of the telephone system. When the caller identification stored in the control buffer is identical to one of the existing caller identifications stored in the memory, the existing caller identification that is identical to the caller identification is deleted from the memory. The caller identification is then transferred from the control buffer to the memory, and stored in the memory according to a last in first out rule. The caller identification is displayed on a display unit of the telephone system in response to a first input of a search key. Then, the telephone number corresponding to the caller identification is automatically dialed in response to input of a start key.

13 Claims, 4 Drawing Sheets

AUTOMATIC DIALING METHOD USING CALLER IDENTIFICATION

CROSS-REFERENCE TO RELATED APPLICATIONS

This application makes reference to, incorporates the same herein, and claims all benefits accruing under 35 U.S.C. §119 arising from an application for Automatic Dialing Method Using Caller Identification earlier filed in the Korean Industrial Property Office on Dec. 20, 1995 and there duly assigned Serial No. 52606/1995.

BACKGROUND OF THE INVENTION

The present invention relates to an automatic dialing method for a telephone system using a caller identification (ID), and more particularly, to a method of automatically registering a detected caller identification (ID) in a memory of a telephone system to optimally enable dialing of a telephone number corresponding to the detected caller identification (ID).

Caller identification (ID) is a feature provided by many conventional telephone systems. According to this feature, a caller's telephone number is sent together with a ring signal during an incoming call. The caller's telephone number is then displayed for a user, so that the user can know who is calling before deciding to answer the call. As a result, the user can be prevented from wasting time or labour due to an unwanted telephone call.

Several prior art references discuss the concept of caller identification (ID) in a telephone system. U.S. Pat. No. 5,452,346 entitled Telephone Apparatus With Caller Identification issued to Miyamoto, for example, discloses a specific design for a telephone system employing caller identification (ID). In Miyamoto '346, a decoder detects and decodes telephone number information of a calling side that is transmitted through a telephone line. A memory stores telephone number data of calling sides in correspondence with operation keys. When a call is received, a comparison circuit compares output data from the decoder with the telephone number data stored in memory. If a coincidence is detected between the output data of the decoder and the telephone number data in the memory, an output device notifies a user that the call corresponds to one of the telephone numbers stored in memory. While conventional art, such as Miyamoto '346, provides a telephone system user with certain benefits, I note that it fails to automatically register caller identifications (IDs) in a manner so as to optimally facilitate an automatic dialing operation.

SUMMARY OF THE INVENTION

Accordingly, it is an object of the present invention to provide an improved method for detecting a caller identification (ID) provided with a ring signal, and automatically registering the caller identification (ID) in a memory of a telephone system.

It is another object to provide a method for automatically registering a detected caller identification (ID) in a memory of a telephone system according to a last in first out rule.

It is still another object to provide a method for automatically registering a detected caller identification (ID) in a memory of a telephone system to optimally enable dialing of a telephone number corresponding to the detected caller identification (ID).

To achieve these and other objects, the present invention provides a dialing method for a telephone system that begins by receiving a caller indentification (i.e., telephone number) of a party calling the telephone system. The received caller identification is then stored in a control buffer of the telephone system. A control unit of the telephone system determines whether the caller identification stored in the control buffer is identical to one of a plurality of existing caller identifications stored in a memory of the telephone system. When the caller identification stored in the control buffer is identical to one of the existing caller identifications stored in the memory, the existing caller identification that is identical to the caller identification is deleted from the memory. The caller identification is then transferred from the control buffer to the memory, and stored in the memory according to a last in first out rule. The caller identification is displayed on a display unit of the telephone system in response to a first input of a search key. Then, the telephone number corresponding to the caller identification is automatically dialed in response to input of a start key.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
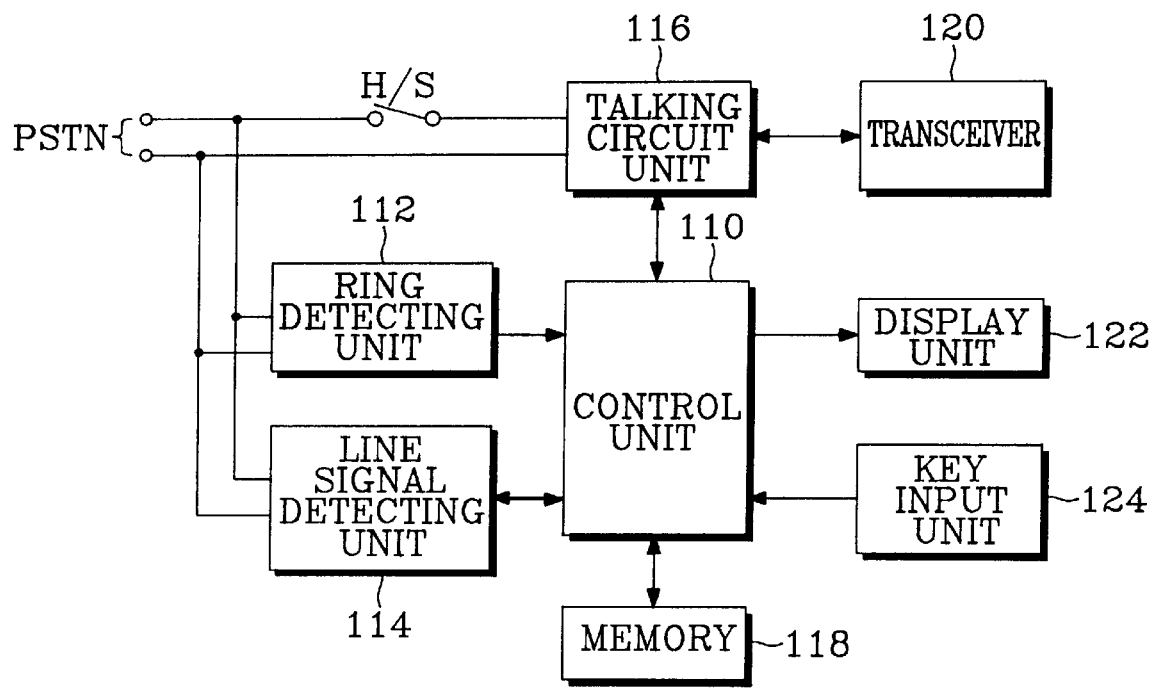
FIG. 1 is a block diagram of a telephone system constructed according to the principles of the present invention.

Turning now to the drawings and referring to FIG. 1, a telephone system constructed according to the principles of the present invention is shown. In FIG. 1, a control unit 110 controls the overall operation of the telephone system, and includes an interior buffer for temporarily registering a caller identification (ID) (i.e., a caller's telephone number) received through a public switched telephone network (PSTN). Control unit 110 also enables the temporarily registered caller identification (ID) to be transferred and registered in a memory 118, and controls an operation of searching for a registered caller identification (ID). A ring detecting unit 112 is connected to the public switched telephone network (PSTN). The ring detecting unit 112 detects a ring signal received through the public switched telephone network (PSTN), and transmits the ring signal to control unit 110. A line signal detecting unit 114 detects the caller identification (ID) (i.e., a caller's telephone number) received through the public switched telephone network (PSTN), and provides the caller identification (ID) to control unit 110. A talking circuit unit 116 is connected to the public switched telephone network (PSTN) through a hook switch (H/S), and interfaces various tone signals and vocal signals between a telephone speech network and the public switched telephone network (PSTN). Memory 118 is used to register the caller identifications (IDs) according to a reception sequence after they are detected by line signal detecting unit 114. Memory 118 also reads selected caller identifications (IDs), and provides the selected caller identifications (IDs) to control unit 110. A transceiver 120 includes a transmitter which converts a user's vocal signal into an electrical signal for output to talking circuit unit 116, and a receiver which converts an electrical signal received from talking circuit unit 116 into an audible sound (i.e., voice). A display unit 132 displays the present operating state of the telephone system, and displays the caller identification (ID) selected during the searching of the caller identifications (IDs) registered in memory 118 under the control of control unit 110. A key input unit 124 includes: a search key for searching for caller identifications (IDs) registered in memory 118, a start key for automatically dialing the telephone number corresponding to the selected caller identification (ID), and a stop key for terminating the search of caller identifications (IDs). Key input unit 124 also generates key instructions and data according to a key input, and provides them to control unit 110. Hook switch (H/S) having a hook relay connects the public switched telephone network (PSTN) to talking circuit unit 116 under the control of control unit 110.

Figure 2:
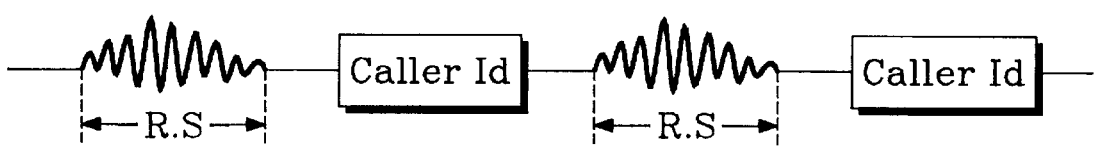
FIG. 2 is a waveform diagram of a ring signal containing a caller identification (ID) received from an office exchange.
Figure 3:
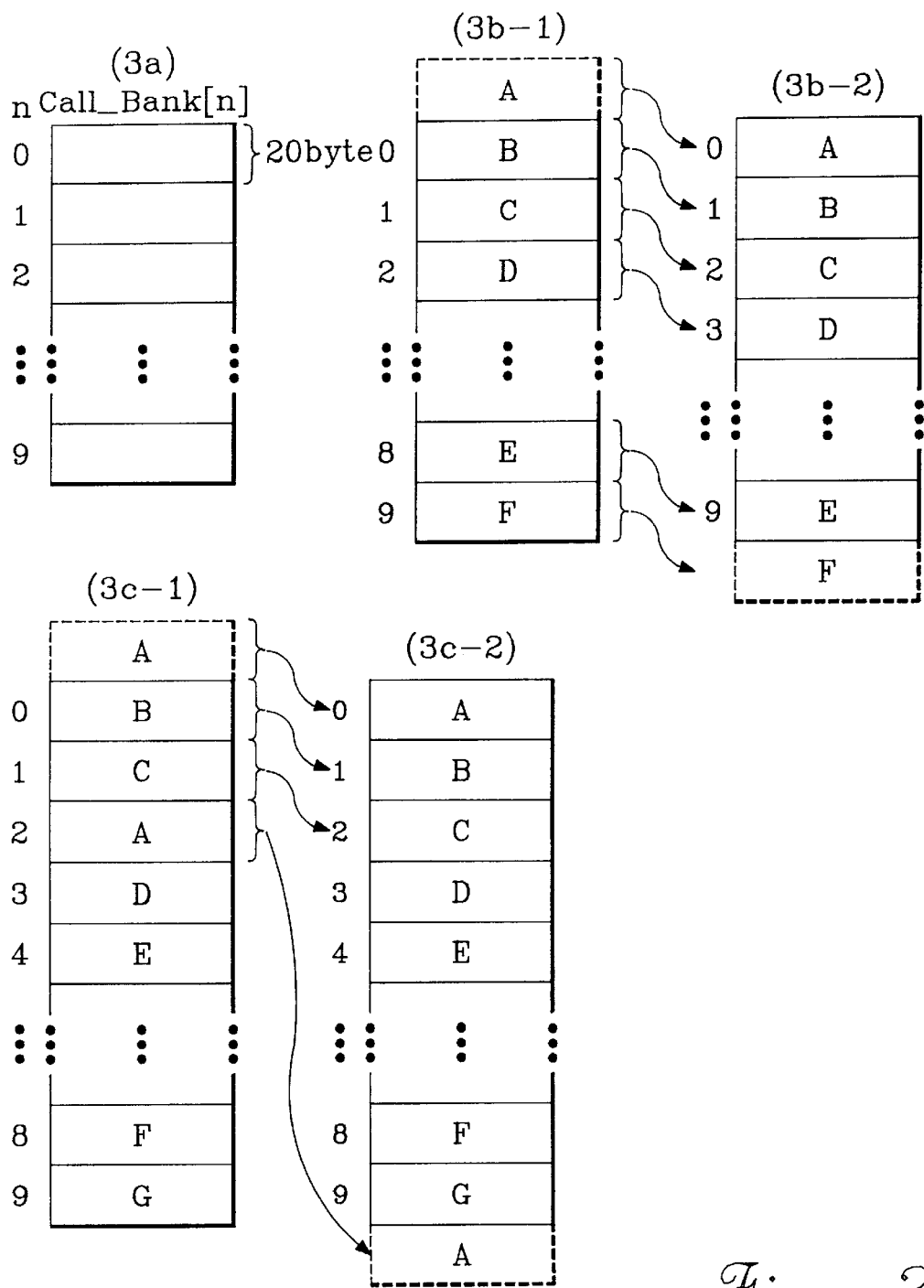
FIG. 3 is a memory map in which the caller identification (ID) is registered according to the principles of the present invention.

FIG. 2 is a waveform diagram of a ring signal containing a caller identification (ID) received from an office exchange, and FIG. 3 is a memory map in which the caller identification (ID) is registered according to the principles of the present invention.

Reference character 3a of FIG. 3 shows the structure of memory 118 shown in FIG. 1. Memory 118 includes ten data buffers (Call_Bank) in which the detected caller identification (ID) is automatically registered. Each data buffer provides twenty (20) bytes of data storage capacity. The ten data buffers are operated according to a "last in first out" (LIFO) rule. Reference characters 3b-1 and 3b-2 of FIG. 3 show a preferred embodiment for registering a detected caller identification (ID) when the detected caller identification (ID) has not previously been registered in the data buffers (Call_Bank). Alternatively, reference characters 3c-1 and 3c-2 of FIG. 3 show a preferred embodiment for registering a detected caller identification (ID) when the detected caller identification (ID) has previously been registered in the data buffers (Call_Bank).

Figure 4:
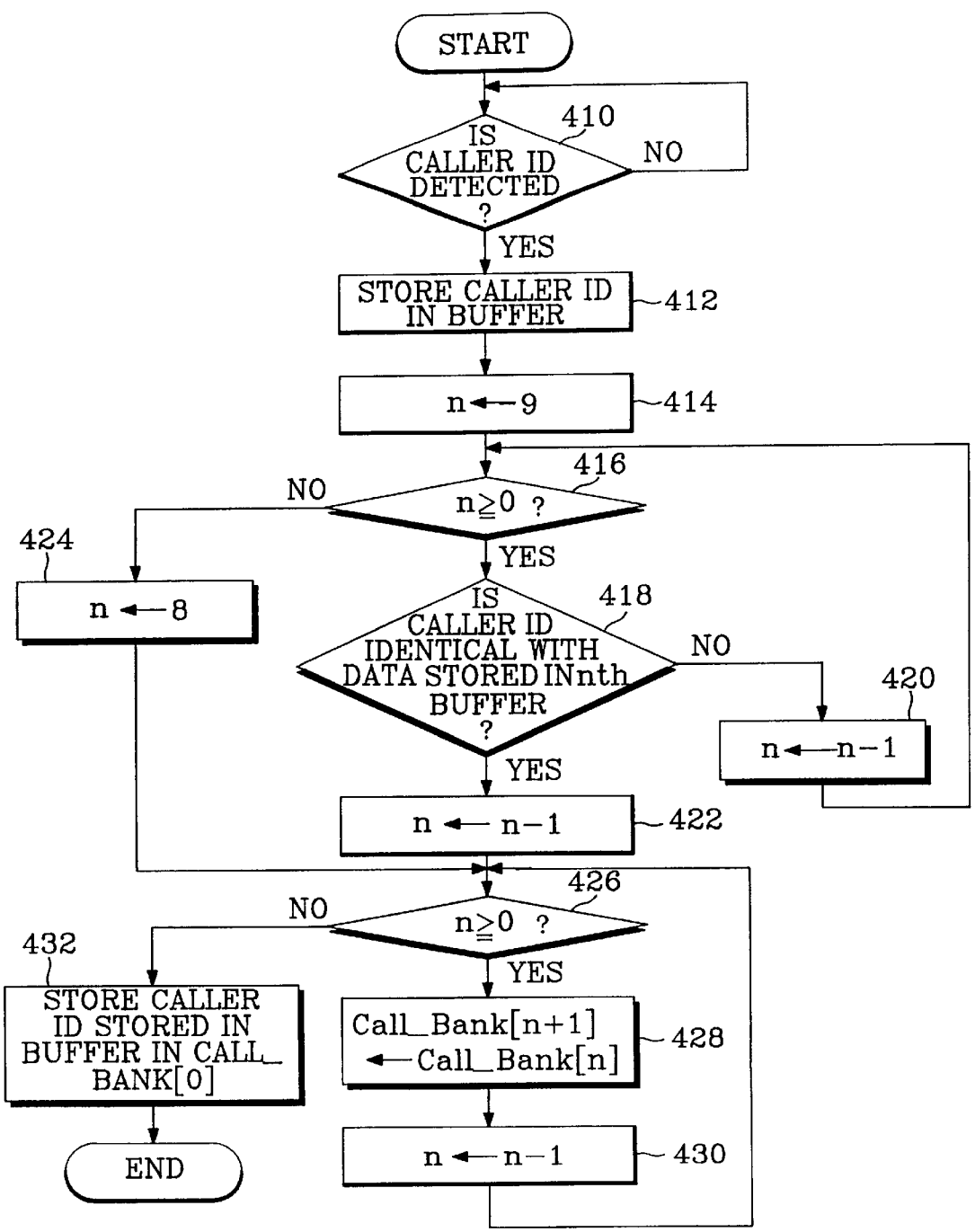
FIG. 4 is a flow chart of steps for registering a received caller identification (ID) according to the principles of the present invention.

FIG. 4 is a flow chart of steps for registering a received caller identification (ID) according to the principles of the present invention. Briefly, the flow chart of FIG. 4 includes the steps of: detecting a caller identification (ID) received during an incoming call, temporarily storing the detected caller identification (ID) in an inner buffer of control unit 110, determining whether the detected caller identification (ID) has previously been registered in memory 118, registering the detected caller identification (ID) in memory 118 after eliminating identical caller identification (ID) from memory 118 when the detected caller identification (ID) has previously been registered in memory 118, and registering the detected caller identification (ID) as new caller identification (ID) when the detected caller identification (ID) has not previously been registered in memory 118.

Figure 5:
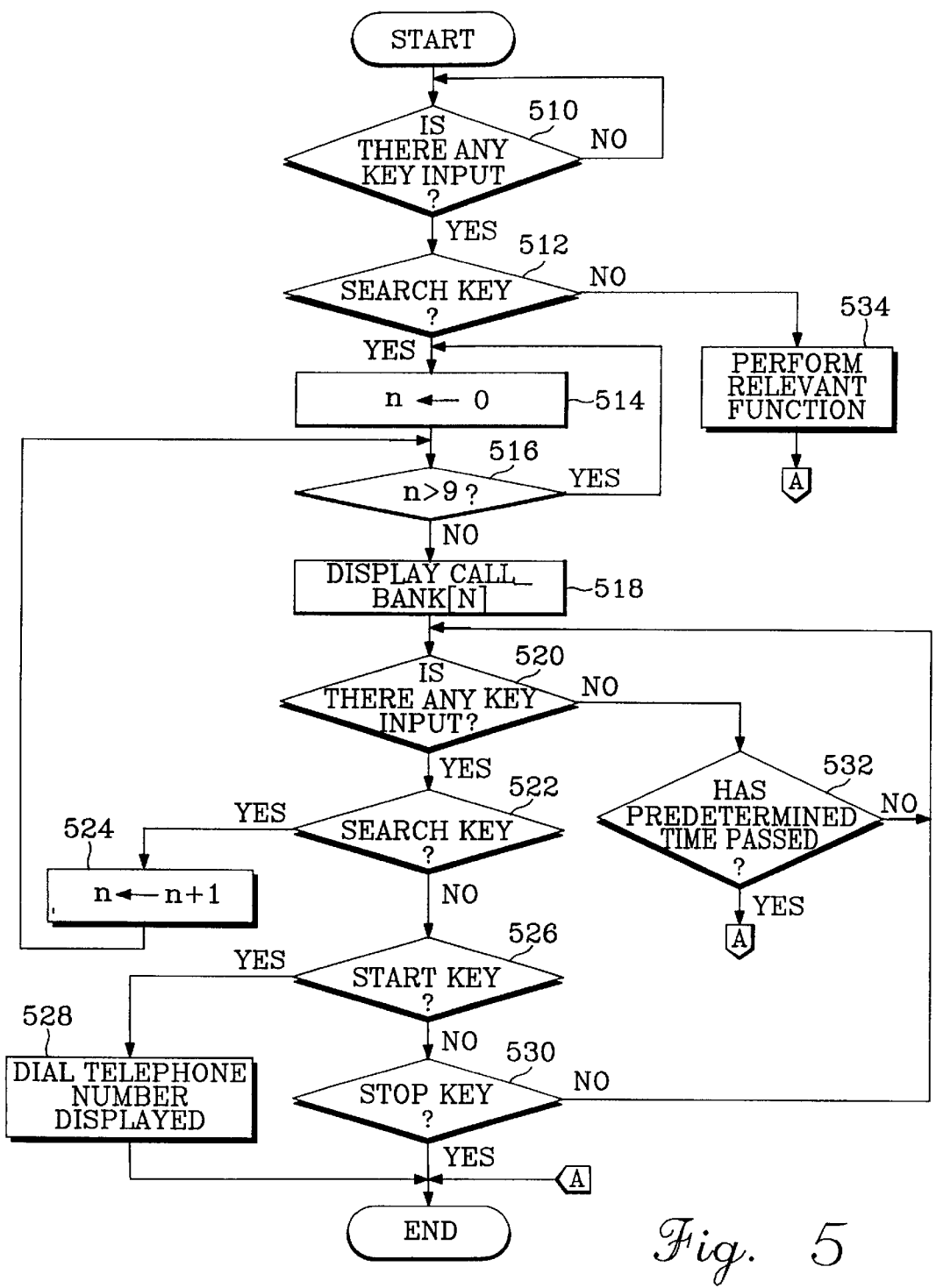
FIG. 5 is a flow chart of steps for searching for a registered caller identification (ID) according to the principles of the present invention.

FIG. 5 is a flow chart of steps for searching for a registered caller identification (ID) according to the principles of the present invention. Briefly, the flow chart of FIG. 5 includes the steps of: sequentially displaying caller identifications (IDs) in response to successive inputs of the search key, connecting a call by automatically dialing a telephone number corresponding to the displayed caller identification (ID) when the start key is input, and finishing the search for caller identification (ID) when the stop key is input.

With reference to the appended drawings, the preferred embodiments of the present invention will now be described in detail.

As shown in FIG. 4, control unit 110 first determines whether a caller identification (ID) is detected by line signal detecting unit 114, in step 410. When a caller identification (ID) is detected by line signal detecting unit 114, control unit 110 temporarily stores the detected caller identification (ID) in the inner buffer, in step 412. Control unit 110 then sets a count variable n to a value of 9, in step 414. The count variable n is used for checking the caller identifications (IDs) registered in the ten buffers (Call_Bank[0]-Call_Bank[9]) of memory 118. Next, control unit 110 determines whether the count variable n is greater than or equal to 0, in step 416. When the count variable n is greater than or equal to 0, the caller identification (ID) temporarily stored in the inner buffer of control unit 110 is compared with the caller identification (ID) registered in the nth buffer (Call_Bank[n]) of memory 118 (see 3a of FIG. 3) to determine whether they are identical, in step 418. When the caller identifications (IDs) are different, the count variable n is decremented by one in step 420, and step 416 is again performed.

When the detected caller identification (ID) has not previously been registered in memory 118, steps 416 to 420 are repeated until the count variable n is less than 0. When this condition is detected in step 416, control unit 110 sets the count variable n to a value of 8, in step 424. The count variable n is set to 8 in order to transfer each caller identification (ID) registered in memory 118 from a present buffer (Call_Bank[n]) to a next buffer (Call_Bank[n−1]). Control unit 110 then determines whether the count variable n is greater than or equal to 0, in step 426. When the count variable n is greater than or equal to 0 in step 426, the caller identification (ID) registered in the nth buffer of memory 118 (Call_Bank[n]) is transferred to the next buffer (Call_Bank[n+1]), in step 428. Then, the count variable n is decremented by one in step 430, and step 426 is again performed.

After all of the caller identifications (IDs) registered in memory 118 have been transferred to the next buffer (Call_Bank[n+1]) through the repetition of steps 428 to 430, the count variable n will exhibit a value that is less than 0. When this condition is detected in step 426, control unit 110 stores the caller identification (ID) temporarily stored in its inner buffer in the buffer 0 (Call_Bank[0]) in step 432, and the procedure ends.

Referring back to FIG. 3, the technique for registering detected caller identification (ID) when the detected caller identification (ID) has not previously been registered in memory 118 will now be described using reference characters 3b-1 and 3b-2.

When a caller identification (ID) "A" is detected under the condition that caller identifications (IDs) are registered in memory 118 according to the format shown by reference character 3b-1 of FIG. 3, control unit 110 temporarily stores caller identification (ID) "A" in its inner buffer having 20 bytes of data storage capacity. Control unit 110 then compares caller identification (ID) "A" with each of the caller identifications (IDs) registered in buffers (Call_Bank[0]-Call_Bank[9]) of the memory 118. Since caller identification (ID) "A" has not previously been registered in the buffers (Call_Bank[0]-Call_Bank[9]) of memory 118, caller identification (ID) "B" to caller identification (ID) "E", which are registered in the buffers (Call_Bank[0]-

Call_Bank[8]), are transferred and registered as indicated by reference character 3b-2 of FIG. 3. The caller identification (ID) "F" registered in buffer 9 (Call_Bank[9]) of 3b-1 is eliminated, and the newly detected caller identification (ID) "A" is registered in buffer 0 (Call_Bank[0]). Reference character 3b-2 of FIG. 3 represents a map of the buffers (Call_Bank[0]-Call_Bank[9]) of memory 118 after the registering steps are completed.

Alternatively, when a detected caller identification (ID) has previously been registered in memory 118, this condition is recognized in step 418 of FIG. 4, and the steps for re-registering the detected caller identification (ID) in memory 118 will be as follows.

Control unit 110 decrements the count variable n by one in step 422. This is performed to eliminate the identical caller identification (ID) which has already been registered in the nth buffer (Call_Bank[n]), and transfer the registered caller identification (ID) to a preceding buffer (Call_Bank[n−1]). After control unit 110 has transferred all of the caller identifications (IDs) from the buffers n−1 (Call_Bank[n−1]) to 0 (Call_Bank[0]) through steps 426 to 430, the count variable n becomes less than 0, and control unit 110 stores the caller identification (ID) temporarily stored in its inner buffer in the buffer 0 (Call_Bank[0]), in step 432.

The technique for registering detected caller identification (ID) when the detected caller identification (ID) has previously been registered in memory 118 will now be described using reference characters 3c-1 and 3c-2 of FIG. 3.

When a caller identification (ID) "A" is detected under the condition that caller identifications (IDs) are registered in memory 118 according to the format shown by reference character 3c-1 of FIG. 3, control unit 110 temporarily stores caller identification (ID) "A" in its inner buffer having 20 bytes of data storage capacity. Control unit 110 then compares caller identification (ID) "A" with each of the caller identifications (IDs) registered in buffers (Call_Bank[0]-Call_Bank[9]) of the memory 118. Since the caller identification (ID) "A" has already been registered in buffer 2 (Call_Bank[2]) of memory 118, as indicated by reference character 3c-1 of FIG. 3, it is eliminated from buffer 2 (Call_Bank[2]). The caller identification (ID) "C" registered in buffer 1 (Call_Bank[1]) is then transferred to buffer 2 (Call_Bank[2]), as indicated by reference character 3c-2 of FIG. 3. Moreover, caller identification (ID) "B" is transferred from buffer 0 (Call_Bank[0]) to buffer 1 (Call_Bank[1]). The new caller identification (ID) "A" temporarily stored in the inner buffer of control unit 110 is registered in buffer 0 (Call_Bank[0]). Consequently, reference character 3b-2 of FIG. 3 represents a map of the buffers (Call_Bank[0]-Call_Bank[9]) of memory 118 after the registering steps are completed.

Referring now to FIG. 5, a flow chart of steps for searching for a registered caller identification (ID) according to the principles of the present invention will be described in detail.

In step 510, control unit 110 determines whether any key is input from the key input unit 124. When any key input from key input unit 124 is detected in step 510, control unit 110 determines whether the key is the search key, in step 512. When the key is the search key, the count variable n is set to 0, in step 514. The count variable n is set to 0 so that the caller identification (ID) registered in buffer 0 is output prior to any other caller identifications (IDs). That is, the count variable n is set to 0 to enable execution of the "last in first out" (LIFO) rule. Next, in step 516, control unit 110 determines whether the count variable n is greater than nine, which represents the last buffer (Call_Bank[9]). When the count variable n is greater than 9, the count variable n is reset in step 514. Alternatively, when the count variable n is not greater than 9, control unit 110 enables the caller identification (ID) registered in buffer n (Call_Bank[n]) to be displayed through the display unit 122. Since the count variable n was set to 0 in step 514, the caller identification (ID) registered in buffer 0 (Call_Bank[0]) is displayed first.

While the caller identification (ID) registered in buffer n (Call_Bank[n]) is displayed, control unit 110 determines whether any key is input from the key input unit 124, in step 520. When a key input from the key input unit 124 is not provided within a predetermined time, this condition is detected in step 532, and the process ends. Alternatively, when a key input from key input unit 124 is provided within the predetermined time, control unit 110 determines whether the key is the search key, in step 522. When the key is the search key, control unit 110 increments the count variable n by one, in step 524, and enables display of the caller identification (ID) registered in the next buffer (Call_Bank[n]) on the display unit 122 through steps 516 to 518. On the other hand, when the key is not the search key, but the start key, this condition is detected in step 526. Control unit 110 responds to input of the start key by automatically dialing the telephone number corresponding to the caller identification (ID) displayed on display unit 122, in step 528. Alternatively, when the key is the stop key, this condition is detected in step 530. Control unit 110 responds to input of the stop key by ending the process.

As described above, the present invention automatically registers a caller identification (ID) (i.e., a caller's telephone number) after detecting it from an incoming ring signal. Accordingly, it is possible to reduce the annoyance caused by an obscene or threatening call, and a user can know a telephone number received in his absence. Moreover, the user can advantageously dial a caller's telephone number through a simplified process.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A dialing method for a telephone system using a caller identification, comprising steps of:

receiving, in response to an incoming call, a telephone number of a party calling said telephone system as a caller identification from said incoming call interposed between ring signals;

automatically registering said caller identification, while said ring signals indicative of said incoming call are being received, in a memory of said telephone system according to a last in first out rule by:

temporarily storing said caller identification in a temporary storage unit of said telephone system;

comparing said caller identification stored in said temporary storage unit with existing caller identifications registered in said memory; and registering said caller identification in said memory according to said last in first out rule by transferring said caller identification from said temporary storage unit to said memory, and when said caller identification is identical to one of said existing caller identifications registered in said memory, deleting the one of said existing caller identifications that is identical to said caller identification from said memory;

after said ring signals are terminated, and said caller identification is registered in said memory, searching said memory for said caller identification in response to input of a search key from an operational panel of said telephone system; and then after said caller identification is searched, automatically dialing said telephone number corresponding to said caller identification in response to input of a start key from said operational panel of said telephone system.

2. The dialing method of claim 1, wherein said step of automatically registering said caller identification comprises substeps of:

temporarily storing said caller identification in a temporary storage unit of said telephone system;

comparing said caller identification stored in said temporary storage unit with existing caller identifications registered in said memory; and registering said caller identification in said memory according to said last in first out rule by transferring said caller identification from said temporary storage unit to said memory.

3. The dialing method of claim 2, wherein said step of searching comprises substeps of:

providing display of said caller identification on a display unit of said telephone system in response to input of said search key; and sequentially displaying said existing caller identifications registered in said memory via successive inputs of said search key.

4. The dialing method of claim 1, wherein said step of searching comprises substeps of:

providing a visual display of said caller identification on a display unit of said telephone system in response to input of said search key; and sequentially displaying said existing caller identifications registered in said memory on said display unit via successive inputs of said search key.

5. The dialing method of claim 3, wherein said step of dialing said telephone number is automatically performed in response to input of said start key, while said telephone number is displayed on said display unit.

6. The dialing method of claim 4, wherein said step of dialing said telephone number is automatically performed in response to input of said start key, while said telephone number is displayed on said display unit.

7. The dialing method of claim 1, wherein said caller identification is received between said ring signals during said incoming call to said telephone system and temporarily stored in said temporary storage unit, and subsequently stored in said memory when said caller identification does not correspond to any existing caller identifications registered in said memory.

8. The dialing method of claim 5, wherein said caller identification is received between said ring signals during said incoming call to said telephone system and temporarily stored in said temporary storage unit, and subsequently stored in said memory when said caller identification does not correspond to any existing caller identifications registered in said memory.

9. The dialing method of claim 6, wherein said caller identification is received between said ring signals during said incoming call to said telephone system and temporarily stored in said temporary storage unit, and subsequently stored in said memory when said caller identification does not correspond to any existing caller identifications registered in said memory.

10. A dialing method for a telephone system, comprising steps of:

receiving, in response to an incoming call from a central office exchange, a telephone number of a party calling said telephone system as a caller identification from said incoming call interposed between ring signals;

storing said caller identification in a control buffer of said telephone system;

determining whether said caller identification stored in said control buffer is identical to one of a plurality of existing caller identifications stored in a memory of said telephone system;

when said caller identification stored in said control buffer is identical to one of said existing caller identifications stored in said memory, deleting the one of said existing caller identifications that is identical to said caller identification from said memory;

transferring said caller identification from said control buffer to said memory, and storing said caller identification in said memory according to a last in first out rule;

providing a visual display of said caller identification on a display unit of said telephone system in response to input of a search key; and then automatically dialing said telephone number corresponding to said caller identification in response to input of a start key.

11. The dialing method of claim 10, wherein said caller identification is received between said ring signals during said incoming call to said telephone system and temporarily stored in said control buffer, and then stored in said memory when said caller identification does not correspond to any existing caller identifications registered in said memory.

12. A telephone system, comprising:

a line signal detecting unit for detecting a caller identification comprising a telephone number of a caller from an incoming call interposed between ring signals;

a control unit for controlling an overall operation of said telephone system, said control unit receiving said caller identification from said line signal detecting unit and storing said caller identification in a buffer of said control unit;

a key input unit having a plurality of keys for providing key inputs to said control unit, said keys comprising a search key and a start key;

a display unit for providing visual displays in response to a control of said control unit;

a memory for storing existing caller identifications; and said control unit determining whether said caller identification stored in said buffer is identical to one of said existing caller identifications stored in said memory, transferring said caller identification from said buffer to said memory, storing said caller identification in said memory according to a last in first out rule, enabling a visual display of said caller identification on said display unit in response to input of said search key, and then automatically dialing said telephone number corresponding to said caller identification in response to input of said start key, and deleting one of said existing caller identifications that is identical to said caller identification from said memory, when said caller identification stored in said buffer is identical to one of said existing caller identifications stored in said memory.

13. The telephone system of claim 12, further comprising a ring detecting unit for detecting ring signals from a public switched telephone network, and providing said ring signals to said control unit.

* * * * *